United States Patent [19]

Platts

[11] Patent Number: 5,250,098
[45] Date of Patent: Oct. 5, 1993

[54] THERMALLY DURABLE ANTI-REFLECTIVE GLASS

[75] Inventor: Dennis R. Platts, Livonia, Mich.

[73] Assignee: Ford Motor Company, Dearborn, Mich.

[21] Appl. No.: 919,319

[22] Filed: Jul. 27, 1992

[51] Int. Cl.$^5$ .......................................... C03C 21/00
[52] U.S. Cl. .................................. 65/30.1; 65/30.13; 427/523; 427/531; 427/165
[58] Field of Search ........................... 65/30.13, 30.1; 427/523, 527, 530, 531, 165

[56] References Cited

U.S. PATENT DOCUMENTS

| | | | |
|---|---|---|---|
| 3,556,757 | 1/1971 | Kozlowski et al. | 65/30.13 |
| 3,843,228 | 10/1974 | Yoshiyagawa et al. | 65/30.13 |
| 4,640,900 | 2/1987 | Kokubu et al. | 501/57 |
| 4,822,758 | 4/1989 | Boudot et al. | 501/65 |
| 4,855,260 | 8/1989 | Dumbaugh, Jr. et al. | 501/66 |
| 5,093,196 | 3/1992 | Hecq et al. | 65/31 |
| 5,098,792 | 3/1992 | Sebastiano et al. | 65/30.13 |
| 5,102,736 | 4/1992 | Townsend et al. | 65/30.13 |
| 5,174,876 | 12/1992 | Buchal et al. | 427/531 |

OTHER PUBLICATIONS

Hines, R. L., "Radiation Effect of Positive Ion Bombardment on Glass," Journal of Applied Physics, v. 28, No. 5, pp. 587–591 (1957).

Arnold, G. W., "Radiation Enhanced Diffusion in Ion-Implanted Glasses and Glass/Metal Couples," Mat. Res. Soc. Sym. Proc., v. 27, pp. 61–66 (1984).

Primary Examiner—W. Gary Jones
Assistant Examiner—Steven P. Griffin
Attorney, Agent, or Firm—Lorraine S. Melotik; Roger L. May

[57] ABSTRACT

A process for preparing thermally durable anti-reflective glass comprises injecting element ions into the surface region of a glass sheet by ion implantation and thereafter treating the surface of the glass sheet with an acid or acid salt to remove excess alkali from the surface thereof.

13 Claims, 1 Drawing Sheet

THERMALLY DURABLE ANTI-REFLECTIVE GLASS

FIELD OF THE INVENTION

This invention is directed to thermally durable anti-reflective glass. More particularly, the invention contemplates a process for making anti-reflective glass, which glass retains its anti-reflectivity when heated to conventional glass sheet processing and fabricating temperatures.

BACKGROUND OF THE INVENTION

It is well-known that the visible reflection of light rays from the surface of a sheet of glass may be reduced by modifying the surface of the glass sheet. For example, the surface of the glass sheet may be treated with an etchant such as hydrofluoric acid to produce a frosted, anti-reflective glass for use in portrait frames, etc. Another method for modifying the surface of a glass sheet to produce anti-reflective glass is by ion implantation, wherein ions of an element are electrically accelerated and injected into the glass sheet to a selected depth and concentration in order to produce a solid mixture in the surface region of the glass sheet which thereby exhibits a gradational refractive index.

Hines, R. L., "Radiation Effect of Positive Ion Bombardment on Glass," Journal of Applied Physics, v. 28, no. 5, pp. 587-591 (1957) discloses the ion implantation of argon ions into the surface region of a soda-lime-silica glass sheet, to produce anti-reflective glass. Arnold, G. W., "Radiation Enhanced Diffusion in Ion-Implanted Glasses and Glass/Metal Couples," Mat. Res. Soc. Sym. Proc., v. 27, pp. 61-66 (1984) discloses that such ion implantation causes alkali atom migration to the surface of the soda-lime-silica glass sheet.

It has been discovered that glass sheets, whose surfaces have been modified by ion implantation to produce anti-reflective glass, lose their anti-reflective properties when the glass sheets are heated to conventional glass processing and fabricating temperatures, such as those used to provide pyrolytic coatings thereon or to heat and bend the glass sheets.

It would be desirable to develop a process for preparing ion implanted anti-reflective glass, which glass would not lose its anti-reflectivity as a result of being heated to conventional glass sheet fabricating and processing temperatures.

SUMMARY OF THE INVENTION

Accordant with the present invention, there surprisingly has been discovered a process for preparing thermally durable anti-reflective glass. The process comprises the steps of:

A) injecting element ions into a surface region of a glass sheet by ion implantation; and B) treating the surface of the glass sheet with a compound selected from the group consisting of acids and acid salts, to remove excess alkali from the surface of the glass sheet.

The process of the present invention is particularly well suited for producing anti-reflective glass by ion implantation, which glass is intended to undergo subsequent processing to produce formed automotive and architectural glazings.

BRIEF DESCRIPTION OF THE DRAWING

The novel features that are considered characteristic of the invention are set forth with particularity in the appended claims. The invention will best be understood, however, by reference to the accompanying description of specific embodiments when read in conjunction with the attendant drawing in which

DETAILED DESCRIPTION OF THE PREFERRED EMBODIMENTS

Figure 1:
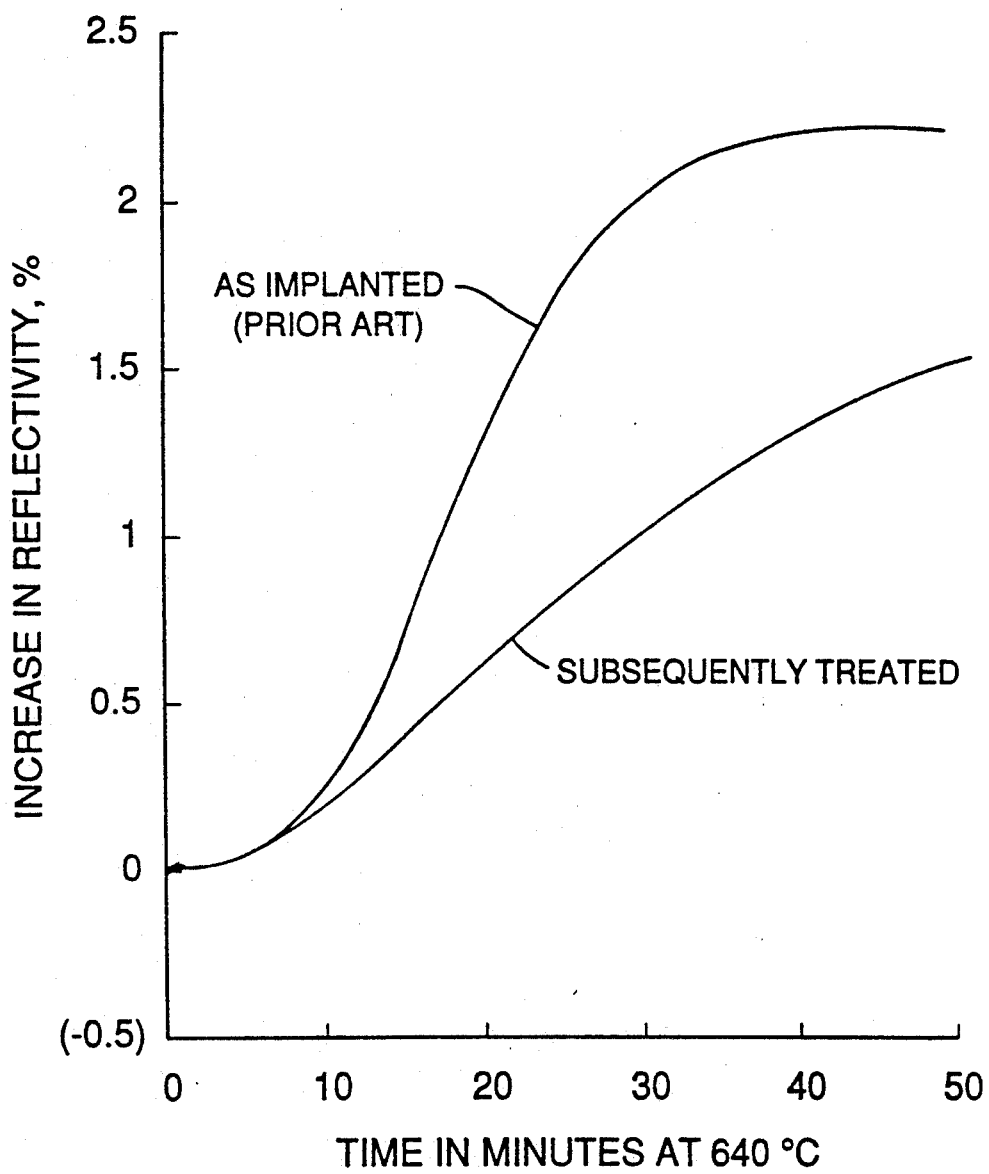
FIG. 1 is a graph illustrating the thermal durability of ion implanted anti-reflective glass.

The present invention is directed to thermally durable anti-reflective glass. By the term "thermally durable" as it is used herein is meant that glass made anti-reflective by ion implantation will retain a greater percentage of anti-reflectivity when heated to conventional glass sheet processing and fabricating temperatures than the ion implanted anti-reflective glass disclosed in the prior art. Temperatures at which glass sheets are typically processed, i.e., formed, annealed, pyrolytically coated, tempered, etc. range from about 400° C. to about 650° C.

Ion implantation is a well-known process for injecting ions of elements into the surface region of a glass sheet. Ions of the selected elements are electrically accelerated toward the target glass sheet, and attain an energy sufficient to cause the element ions to significantly penetrate the glass sheet. The atoms of the selected elements are ionized by collisions with electrons in an electrical discharge in a gas at low pressure, and then accelerated by a negative electrical potential to the penetration velocity. When the ions of the selected elements collide with the surface of the g)ass sheet, they actually tunnel into or are implanted into the surface region of the glass sheet.

Thus, a buried element phase is formed in the surface region of the target glass sheet. Generally, the implanted ions are injected to form a gradational concentration of the element phase. This modified surface region displays a gradational refractive index which is different from the refractive index of the glass. This feature makes the glass anti-reflective.

The properties of the implanted ion layer, and therefore the anti-reflective nature of the glass, may be determined by controlling the ion implantation process variables. Various element ions may be used for the ion implantation process of the present invention including, but not necessarily limited to, argon, nitrogen, aluminum, titanium, etc., as well as mixtures of element ions. Particularly useful element ions comprise argon ions. Ion implantation energies may vary over a wide range from about 1 KeV to about 5 MeV, to produce a useful ion concentration from about $10^{12}$ to $10^{18}$ ions/cm$^2$. Preferably, the ion implantation energy ranges from about 30 KeV to about 70 KeV, and is used to produce an element ion concentration from about $2 \times 10^{16}$ ions/cm$^2$ to about $9 \times 10^{16}$ ions/cm$^2$. The element ions generally penetrate the glass to a depth of up to about 1,500 Angstroms, thereby defining the surface region of the glass sheet having the modified refractive index.

When an ion implanted anti-reflective glass sheet is heated to conventional processing or fabricating temperatures, for example to form or anneal the glass sheet, the anti-reflectivity of the ultimately produced glass sheet is diminished. While not wishing to be bound by any particular theory regarding the mechanism by which ion implanted glass sheets lose their anti-reflectivity over time at elevated temperatures, it is believed that alkali ions which migrate to the surface of the glass sheets during the ion implantation process are reintroduced back into the glass sheets at the elevated processing temperatures, to partially reform the original glass structure.

The process according to the present invention combines a surface dealkyization step with the ion implantation process. The surface of the ion implanted glass sheet is treated with an acid or an acid salt to remove the excess alkali formed at the surface of the glass sheet during the ion implantation operation. The glass surface is treated by applying the acid or acid salt to the surface of the glass sheet, to react with the excess alkali, and thereafter washing the reaction residue off of the glass sheet. The acid or acid salt is generally in the form of an aqueous solution but may also be in the form of a vapor. Useful acids include, but are not necessarily limited to, inorganic acids such as nitric, phosphoric, boric, sulfuric, and hydrochloric acids, as well as mixtures thereof. Organic acids such as for example, acetic acid may also be used singularly or in a mixture with other acids. A preferred acid comprises nitric acid. Alternately, acid salts such as sodium bicarbonate or sodium bisulfate or a mixture thereof may be employed. Finally the resultant residue may be rinsed from the surface of the glass sheet with water. As will be readily apparent to those ordinarily skilled in the art, the acid or acid salt solution concentration, the temperature of the glass sheet during the treatment step, and the time of contact between the acid or acid salt solution and the surface of the glass sheet, may vary over wide limits and are not sharply critical to the successful practice of the present invention. EXAMPLE Samples of clear float glass were implanted with argon ions at about 70 KeV to a dose of about $3 \times 10^{16}$ ions/cm$^2$ to produce anti-reflective glass. For comparison purposes, some of the samples were heated in air for various lengths of time to simulate the loss of antireflectivity at elevated glass processing temperatures, and the increase in reflectivity was measured. The remainder of the samples were treated according to the present invention by immersion in an aqueous solution of nitric acid (pH about 5) for about one hour at about 60° C. Thereafter, these samples were also heated in air, and the increase in reflectivity was measured.

FIG. 1 demonstrates the average increase in reflectivity for the as-implanted samples versus the increase in reflectivity for anti-reflective glass Prepared according to the present invention. It is evident that the Examples produced according to the present invention are more thermally durable than the comparison samples.

These Examples may be repeated with similar success by substituting the generically or specifically described reactants and/or reaction conditions recited herein for those actually used for the previous Examples.

From the foregoing description, one ordinarily skilled in the art can easily ascertain the essential characteristics of this invention, and without departing from the spirit and scope thereof, can make various changes and modifications in the invention to adapt it to various usages and conditions.

What is claimed is:
1. A process for preparing thermally durable anti-reflective glass, comprising the steps of:
   A) injecting element ions into a surface region of a glass sheet by ion implantation; and
   B) treating the surface of the glass sheet with a compound selected from the group consisting of acids and acid salts, to remove excess alkali from the surface of the glass sheet.
2. The process for preparing thermally durable anti-reflective glass according to claim 1, wherein the element ions are selected from the group consisting of argon, nitrogen, aluminum, titanium, and mixtures thereof.
3. The process for preparing thermally durable anti-reflective glass according to claim 1, wherein the element ions comprise argon ions.
4. The process for preparing thermally durable anti-reflective glass according to claim 1, wherein the element ions are implanted at an energy level from about 1 KeV to about 5 MeV.
5. The process for preparing thermally durable anti-reflective glass according to claim 4, wherein the energy level is from about 30 KeV to about 70 KeV.
6. The process for preparing thermally durable anti-reflective glass according to claim 1, wherein the element ions are implanted to a concentration from about $10^{12}$ ions/cm$^2$ to about $10^{18}$ ions/cm$^2$.
7. The process for preparing thermally durable anti-reflective glass according to claim 6, wherein the concentration is from about $2 \times 10^{16}$ ions/cm$^2$ to about $9 \times 10^{16}$ ions/cm$^2$.
8. The process for preparing thermally durable anti-reflective glass according to claim 1, wherein the element ions are implanted to a depth of up to about 1,500 Angstroms.
9. The process for preparing thermally durable anti-reflective glass according to claim 1, wherein the acids are selected from the group consisting of nitric, phosphoric, boric, sulfuric, hydrochloric, and acetic acids and mixtures thereof, and the acid salts are selected from the group consisting of sodium bicarbonate and sodium bisulfate and mixtures thereof.
10. The process for preparing thermally durable anti-reflective glass according to claim 1 wherein the compound comprises nitric acid.
11. A process for making ion implanted anti-reflective glass thermally durable, comprising treating a surface of the glass with a compound selected from the group consisting of acids and acid salts to remove excess alkali from the surface of the glass.
12. The process for making ion implanted anti-reflective glass thermally durable according to claim 11, wherein the acids are selected from the group consisting of nitric, phosphoric, boric, sulfuric, hydrochloric, and acetic acids and mixtures thereof, and the acid salts are selected from the group consisting of sodium bicarbonate and sodium bisulfate and mixtures thereof.
13. The process for making ion implanted anti-reflective glass thermally durable according to claim 11, wherein the compound comprises nitric acid.

* * * * *